Dec. 18, 1923.　　　　　　　　　　　　　　　　　　　1,477,553
E. GRISSINGER
METHOD AND MEANS FOR AMPLIFYING AND PROJECTING SOUND
Original Filed May 22, 1919　　5 Sheets-Sheet 2
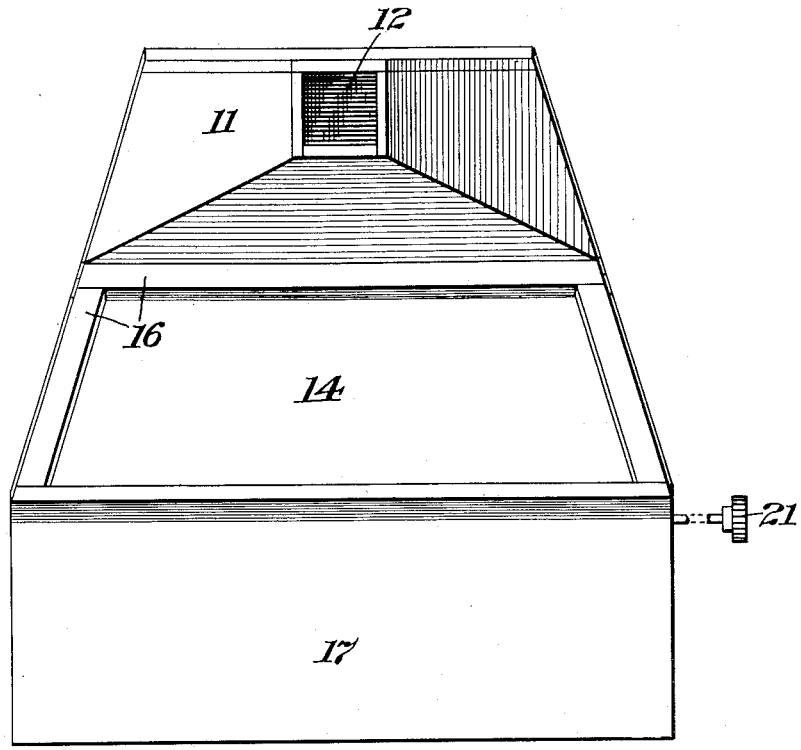
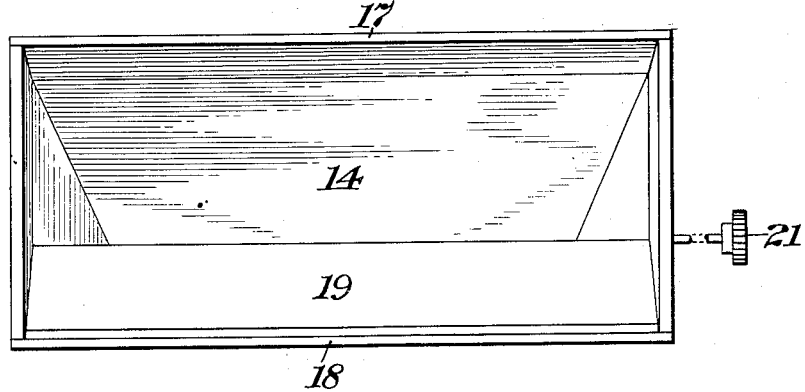
INVENTOR
Elwood Grissinger
BY
George C. Kleam ATTORNEY

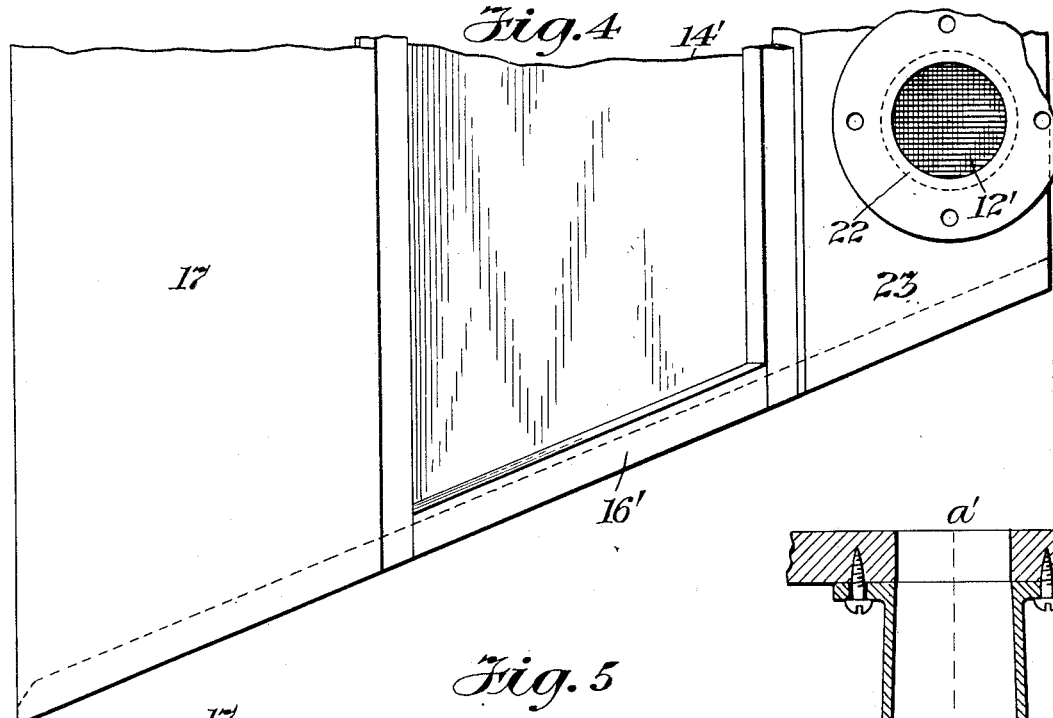
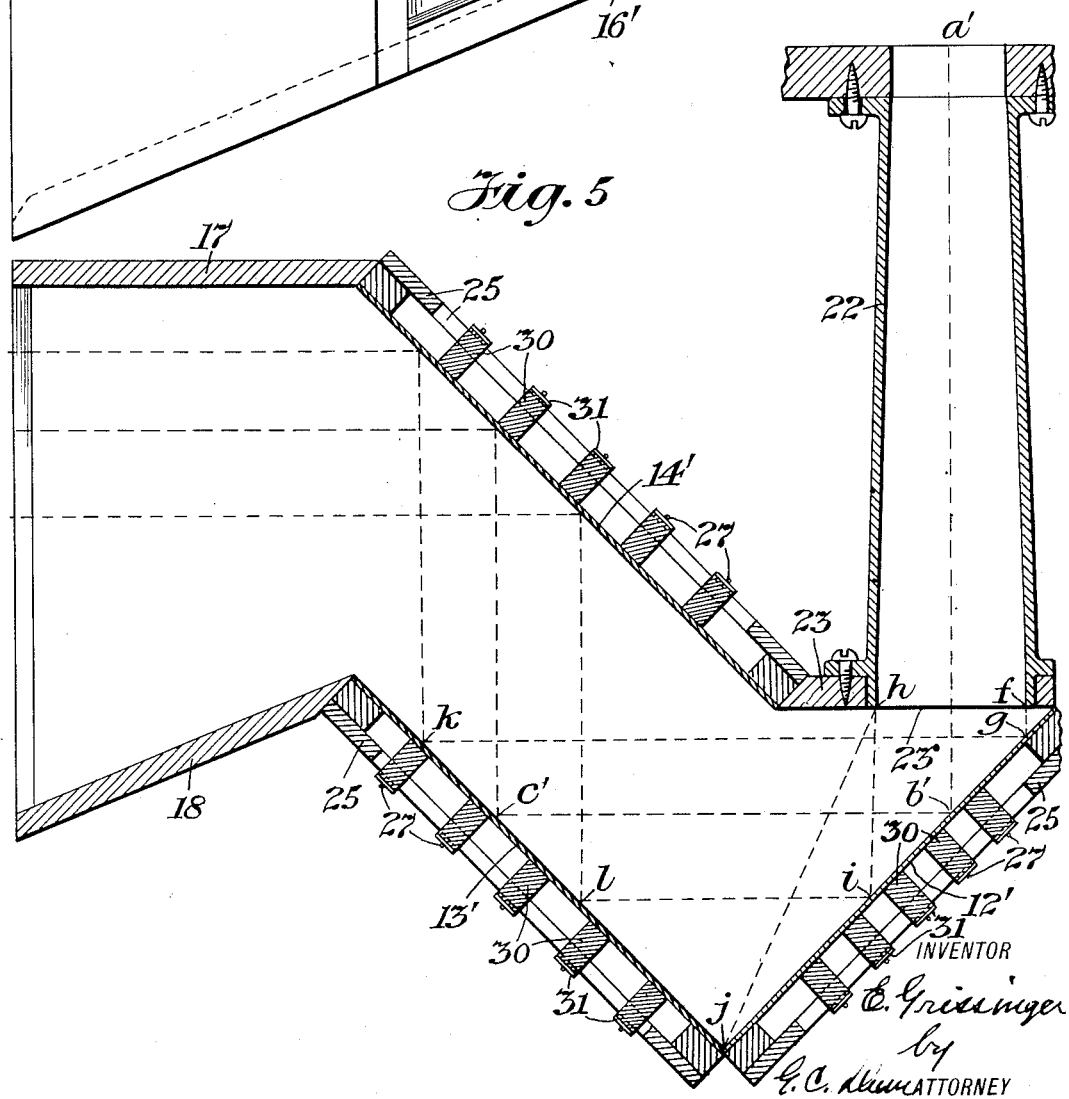

Dec. 18, 1923.
E. GRISSINGER
1,477,553
METHOD AND MEANS FOR AMPLIFYING AND PROJECTING SOUND
Original Filed May 22, 1919    5 Sheets-Sheet 4
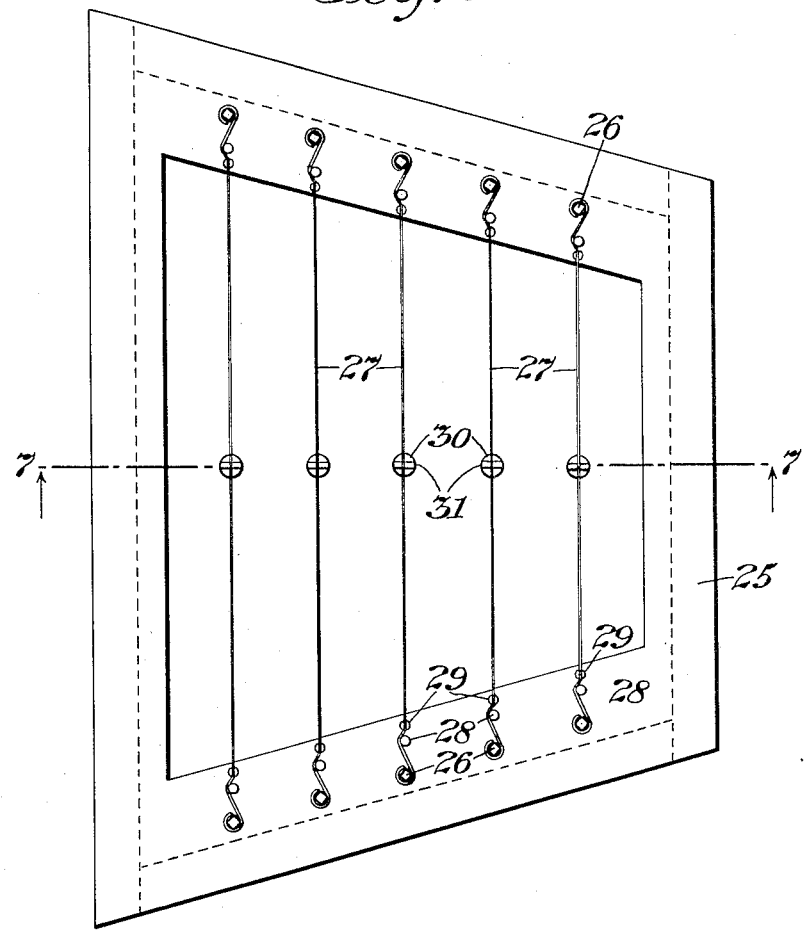
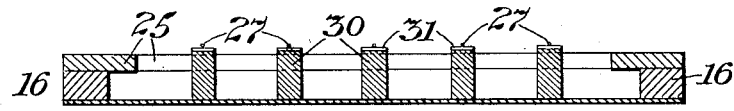
Elwood Grissinger INVENTOR
BY
George C. Allan ATTORNEY Dec. 18, 1923.  1,477,553
E. GRISSINGER
METHOD AND MEANS FOR AMPLIFYING AND PROJECTING SOUND
Original Filed May 22, 1919   5 Sheets-Sheet 5
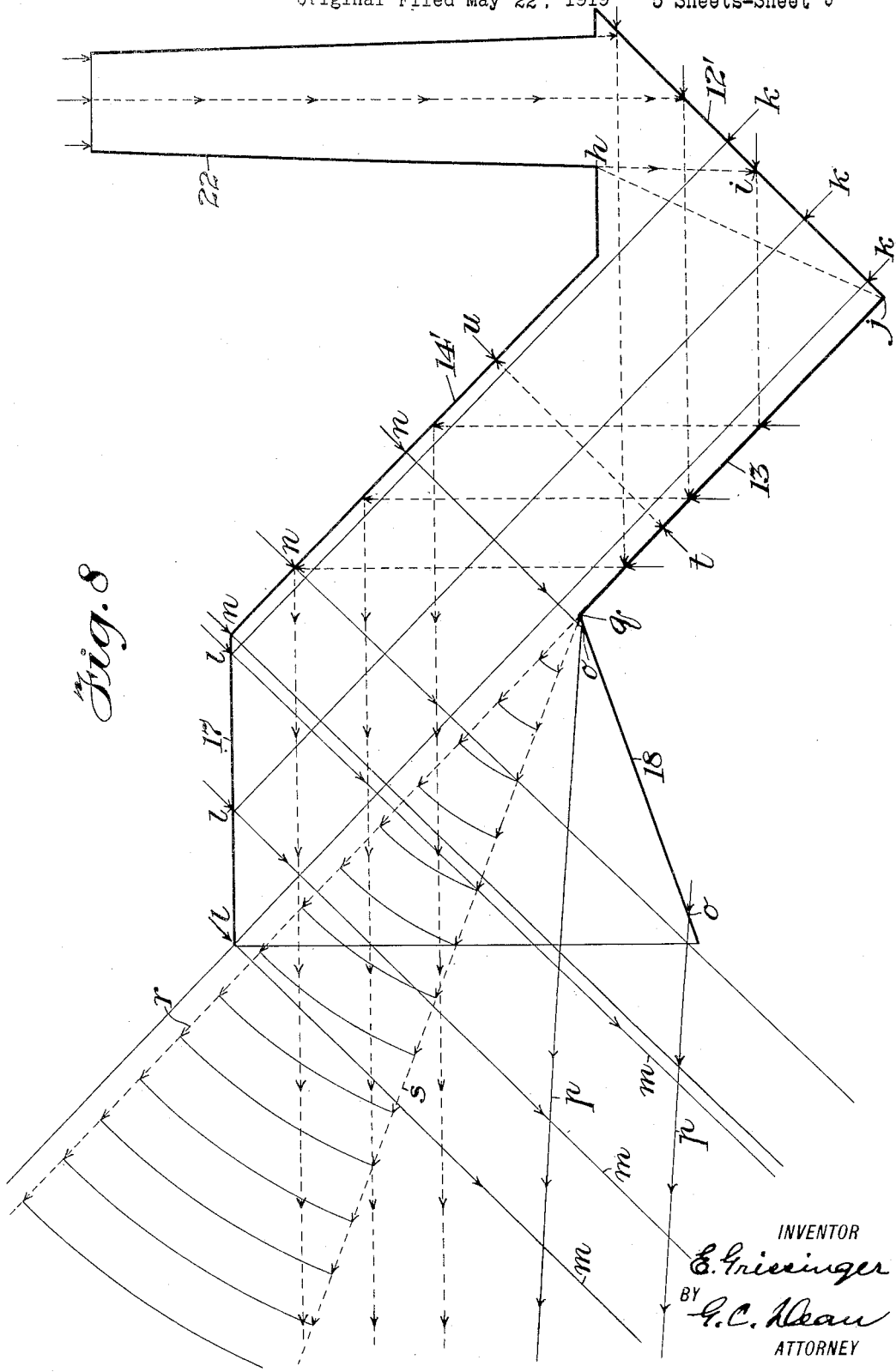
INVENTOR
E. Grissinger
BY
G.C. Dean
ATTORNEY Patented Dec. 18, 1923.

1,477,553

UNITED STATES PATENT OFFICE.

ELWOOD GRISSINGER, OF BUFFALO, NEW YORK, ASSIGNOR TO LUCY ASH GRISSINGER, OF BUFFALO, NEW YORK.

METHOD AND MEANS FOR AMPLIFYING AND PROJECTING SOUND.

Application filed May 22, 1919, Serial No. 298,846. Renewed April 4, 1923.

*To all whom it may concern:*

Be it known that I, ELWOOD GRISSINGER, a citizen of the United States, and resident of Buffalo, in the county of Erie and State of New York, have invented certain new and useful Improvements in Methods and Means for Amplifying and Projecting Sound, of which the following is a specification.

My present invention relates to the amplifying of sound waves, that is, sound vibrations which have been applied to the air and are being elastically propagated therein.

My invention depends upon the fact that while sound waves have many of the characteristics common to all wave phenomena, yet they differ radically in the feature that the oscillatory vibrations whereby the waves are propagated are parallel with the direction of movement of the wave and in that the waves themselves are advancing layers of alternate compression and rarification. Hence, while sound waves tend to travel in a straight line and can be reflected, they require peripheral confining walls on the flanks of the advancing waves in order to present diffusion at the edges. When projected into an open space the dense and rare layers rapidly diffuse and attenuate laterally, at the unconfined edges, so that a "sound beam" or a "sound shadow" is never clean cut and seldom very noticeable.

My invention applies more especially to sound waves propagated through, guided by and projected from a tubular passage in which they have been generated, as for instance, the tone arm leading from the sound box of a phonograph. Sound conducting passages of this type are usually of small diameter as compared with the half wave length of the sounds conducted thereby and where this condition is preserved and particularly if the walls of the tube are kept parallel or slightly expanding, the sounds seem to travel around all curves which are not too abrupt and otherwise to comport themselves in a manner analogous to flow of liquids, that is to say, the sound is propagated with only frictional losses. However, sound waves of such small-area wave front, when discharged directly into the air, produce very little sound effect and it was long since discovered that sound conducting tubes of this kind should terminate in a gradually expanding passage or horn adapted to permit and promote gradual expansion of the wave front to a spherical surface of considerable area and curvature. As an alternative, it has been proposed to discharge these small area waves directly against an open-air sound reflector, but where the expansion conduit principle has been preserved, all abrupt reflections in the large area portions of the conduit have been studiously avoided. As a result, practically all phonographs have the expansion element, whether the old fashioned horn or the newer cabinet arrangements, built on no-reflection, gradual expansion principles. Also, in practically all of them, whatever amplification of sound there is, is due mainly to air column resonance supplemented by such slight amplifying effect as can be attained by mere edge contact of the sound waves travelling substantially parallel with the walls of the expanding passage.

My present invention has to do more particularly with the conduit principle of expansion, that is to say, the enlarging of the wave front to an effective area in a gradually expanding conduit, and one object is to effect the amplification of the sound waves, in such conduit by effective sounding board resonance, or more correctly speaking, sounding board consonance. This is an important distinction because, strictly speaking, sounding board resonance is limited to the amplifying effect which a sounding board has in applying effectively to the air, vibrations mechanically imparted to the sounding board by some vibratory body such as a tuning fork or violin string having solid contact relation therewith. Such resonant amplifying is almost as effective for noises and irregular vibrations as it is for musical sounds, whereas sounding board consonance relates to the sympathetic reaction of a sounding board when air waves impinge upon it, and this consonance effect is much greater for simple harmonic wave trains and harmonious frequency combinations thereof, than it is for discords and noises.

In order to get the maximum of sounding board consonance, I employ a plurality of sounding board elements or plates preferably of very thin highly sonorous wood, constructed and finished with care and delicacy approximating that employed for the sounding board of a piano or the body of a violin. The outlet of the phonograph tone arm is directed so that the waves impinge upon one of these sonorous elements at a high angle, say 45° and preferably not less than 30° nor more than 60°. Interposed in the path of the reflected rays is a second similar element preferably of increasing area to correspond with the increasing cross section of the sound passage. If desired, a third sound reflecting element may be arranged in the path of sound reflected from said second element. The number of reflectors and the angles of incidence and reflection will be governed so that the waves from the last reflector emerge into the open air.

If the sound is discharged from the tone arm into the projector vertically and it is desired to emit the sounds horizontally, this may be accomplished by three 45° reflectors, the first reflecting the waves horizontally, the second vertically and the third again horizontally. If the sound enters the projector horizontally, it may be convenient to use two 45° reflectors, the first reflecting the sound upwardly or downwardly and the second reflecting it horizontally.

Preferably the sonorous reflectors are employed in the two opposite walls only of the projector, and the other two sides may be flat equally diverging plane surfaces which may be non-vibratory as for instance, relatively heavy spruce boards. The projector is preferably rectangular in cross-section throughout and the cross-sectional areas increase progressively toward the exit of the projector. In each cross section, the distance between the non-sonorous sides is preferably greater than the distance between the sonorous sides. Preferably the opposite sonorous sides are approximately parallel but after the last sonorous plate is passed, the walls may diverge vertically to effectively emit and direct the sounds in the outer air, or if desired, may be made adjustable so as to concentrate, distribute or reduce the volume of the sound.

While part of the divergence of the walls of the projector to give the desired increasing cross section toward the outlet, may be attained by arranging the successive reflectors at less than 45° to the incident waves, I usually prefer the other arrangement whereby the waves are laterally confined only by straight diverging walls between which the lateral expansion may develop progressively and uniformly while in the other direction the waves travel by high angle reflections from the sonorous plates.

In predetermining desired variations in arrangement of the sonorous reflectors, the important points are that the projector should be tubular; that it should be of considerable length as compared with its diameter; that it should be of gradually increasing cross sectional area; the main wave front, as distinct from the lateral diffusion, should progress toward the outlet by repeated reflections from highly sonorous surfaces; that in such reflections the angle of incidence is equal to the angle of reflection; that these angles should be high enough to give a substantial impingement of the waves upon the reflectors; that the impingement should not be perpendicular but should be enough less than 90° so that substantially all of the reflected wave front will be advanced toward the outlet of the projector and not backward to impinge upon a preceding reflector or upon the sound inlet passage.

In thus projecting the sound by successive reflections, the reflected "beam" is subject to very considerable attenuation by lateral diffusion wherever the sides or "flanks" of the beam are not guided by the walls. The beam is still further attenuated by the energy used up in causing sympathetic vibration of the sonorous plates. Such attenuation of the main beam is compensated for in other ways. Each plate when vibrating sympathetically, operates as a secondary source of sound waves. These secondary waves are projected more or less perpendicularly from the surface of the plate. Such re-radiated waves are of considerable energy. Moreover, they have little or none of the noises and sharp vibrations representing concussion or scraping of the needle or lever springs or bearings of the reproducer. Hence, an important feature of my invention consists in shaping the projector so that the waves projected perpendicularly from the plates as well as those reflected will be propagated toward the open end of the reflector.

The sonorous plates are designed so that the series of plates taken together are, so to speak, omni-periodic, and will vibrate sympathetically to all frequencies within the range which they are designed to amplify. Many factors may contribute to this end. As shown in the drawings the plates are of different areas and each plate is of increasing width from the edge nearest the inlet to the edge nearest the outlet. The plates are thin so that different portions of the area where the widths are different can respond differently for different periodicities. The sound variations are applied by an impingement beginning at the narrow edge of the plate and progressing toward the wide end of the plate. These dimensional differences all contribute to the desired end but one important feature of my invention consists in accentuating this quality by backing the reflector with a wire or wires highly tensioned and each stretched over a separate bridge piece or pier adapted to apply a regulated thrust to the back of the thin sounding board constituting the sensitive element of the sonorous reflector. By this expedient, different sound boards or different portions of the same board can be differently tensioned, progressively from the narrow end nearest the sound inlet to the wider end nearest the sound outlet. The strings may be progressively increasing in length and decreasing in tension throughout the entire series of reflectors and the reflectors themselves being of different sizes, waves of practically all musical frequencies will each find some special point of impingement where it will be especially amplified, the higher frequencies in the smaller plate and the lower frequencies in the larger plates. The tuning sound boards by tuning of the strings may be varied widely to suit the average condition of the classes of sounds to be amplified. In certain cases such tuning may be confined to major triads or they may be mixed with minor triads and semi-tones.

The wires will resonate to some extent with their own individual frequencies but it is to be particularly noted that the wire vibrations are applied in the projector only through the same plates that their resonance vibrations are derived from. Consequently, they operate to locally increase the stiffness of the plates and the ultimate effect is not so much adding observable notes to the reproduced sounds as it is reenforcing and making them all of more pleasing quality.

While the main factor of amplification in my device is the consonant or sympathetic reaction of the sound board reflectors, it will be evident that the proportions of the projector, particularly its very considerable length as compared with its cross-section, are such that air column resonance is not precluded, because reflection at the open mouth of the horn which is the cause of air column resonance can travel back in the reverse direction to the origin by repeated reflection in reversed order. To whatever extent such reflection and air column resonance occurs the reverse impingement on the sonorous reflectors will to that extent operate to increase their consonant amplifying effect.

In this connection it may be well to note that both air column resonance and sounding board consonance depend upon the actual physical size of the parts as well as their shape, location and relative arrangement. For instance, in the forms of reflecting projectors hereinafter illustrated, the parts have been built upon a scale such that the reflection path of the sound may be 18 inches to 24 inches. In a wide, flaring projector of this type, these measurements afford a length of an air column sufficient to give air column resonance for very low fundamental frequencies, say 250 to 100 per second, and the resonance is fairly uniform for all frequencies higher than the fundamental frequency. The air column in the tone arm and passage to the projector may be 18 inches or more so that the range of possible air column resonance is very wide. Consequently, with the above mentioned physical length, the air column resonance practically covers the range of frequencies capable of being effectively reproduced by phonographic methods.

My above described sonorous amplifying projectors are particularly adapted for use in phonograph instruments of the cabinet type where the projector structure may be built into the cabinet with its inlet end connecting with the tone arm of the phonograph and with its outlet opening through the side of the cabinet.

Desirable embodiments of my invention are shown in the accompanying drawings, in which—

Figure 2 is a top plan view of the projector removed from the cabinet structure;

Figure 3 is a face view looking into the outlet end of the same;

Figure 4 is a top plan view of a modified form;

Figure 5 is a vertical longitudinal section of the same;

Figure 6 is a view of the back side of a sonorous sound board reflector element showing tensioning wires applied thereto to modify the resilience of different parts of the sound board surface; and Figure 7 is a section on the line 7—7, Figure 6.

Figure 8 is a diagram of sound waves.

Figure 1:
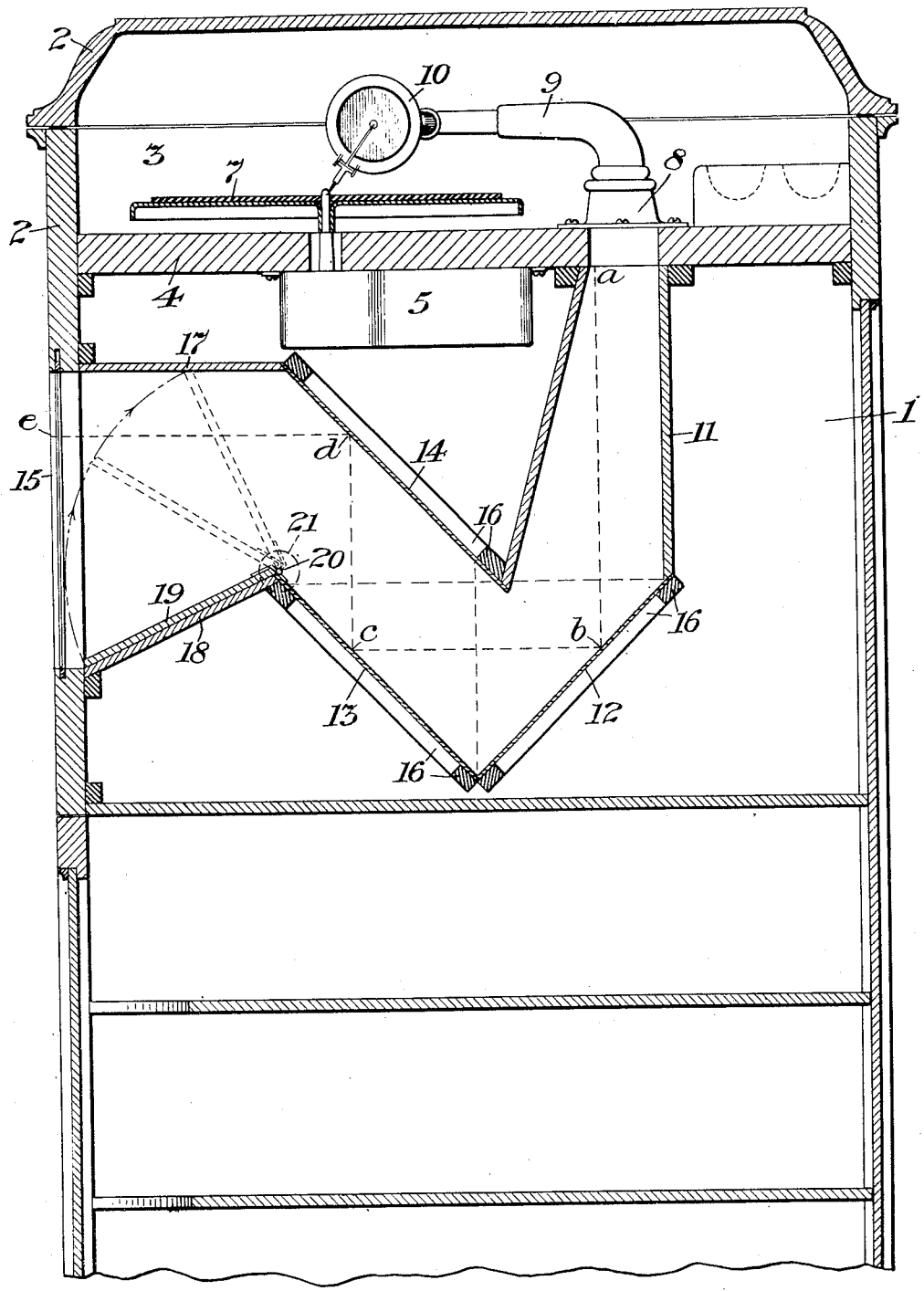
Figure 1 is a vertical section through a phonograph cabinet having one form of my projector embodied therein.

In Figure 1 the various parts of the cabinet phonograph are conventionally indicated. The case 1 has a cover 2 enclosing a shallow cavity 3 having a bottom 4 supporting the phonograph motor case 5, the rotary support 6 for the record 7, the tone arm swivel 8, tone arm 9 and reproducer 10, all of which may be of any known or desired construction.

Communicating with the open lower end of the tone arm is the upper end of a projector inlet 11 having the form of a frustrum of a pyramid and adapted to permit straight line expansion of the sound waves for a predetermined distance. The sound waves propagated from the lower end of the inlet impinge upon the sonorous reflector 12 at a high angle. The angle at the upper edge of the reflector is 45° and for parts lower down, the angles are slightly less than 45°. The incident wave being more or less vertical as indicated by the dotted line. a, b, the reflected wave b, c is approximately horizontal and it impinges upon the second sonorous reflector element 13 which is preferably arranged approximately at right angles to element 12 and hence is adapted to reflect the waves vertically upward along the line $c, d$ where they impinge upon a third sonorous reflector element 14 preferably parallel with 13 so as to reflect the wave along the line $d, e$ into the outer air through a suitable opening 15 in the side of the cabinet. The sides, and preferably all other walls of the box except the sonorous sound board plates are preferably solid, rigid construction, too heavy for consonant reaction in response to any waves which may impinge thereon. A suitable material for such non-sonorous walls of the box is ⅜ inch or preferably ½ inch spruce.

The sonorous sound board elements preferably comprise a substantial, rigid frame 16 preferably made from wood of ample dimensions, say ½ inch by ¾ inch stock, carefully jointed and glued at the corners. The horizontal frame members are preferably parallel while the members on the other two sides diverge to correspond with the divergence of the side walls of the box. Similarly the successive frames are progressively larger size toward the outlet end. While the areas enclosed by the frames may be varied within limits, as may also the scale on which the entire box structure is constructed, I prefer for reasons before stated to have the air column length of the box projector between one and two feet and in such case the dimensions of the different parts may be determined by taking the length of the reflecting surface 12 or 13, Figure 1, as being approximately ten inches and scaling the dimensions of the other parts accordingly.

The sound board may be a single sheet of sound, well seasoned spruce, or other similarly light sonorous material; thin enough to have the required sensitiveness, and sympathetic response to air waves, and preferably not more than ⅛ inch and not less than 1/16 inch in thickness; firmly closing the opening in said frame as for instance by being glued to the upper surface of the frame and finished as fine and smooth as possible by sand papering, treating with a filler, varnishing, preferably with violin varnish (shellac), and then repeated rubbing down and revarnishing.

The sonorous sound board units are applied to the top, bottom and rear ends of the above described side walls, with the sonorous sound board elements preferably directed inward so that they extend entirely across the width of the projector and the side walls thereof, as indicated in Figs. 2, 3 and 4. They are secured in position in any desired way, as by glue, screws or other means for rigidly securing them. In this position the sensitive plates have two of their opposite edges extending crosswise of the projector, while the two side edges are firmly held each between a side frame member and a solid edge of a side wall.

In Figure 1 the projector diverges vertically as well as laterally toward the open end after the last sonorous reflector is passed. The upper wall 17, however, is preferably parallel with the reflected waves and the vertical divergence is effected by the downward inclination of the lower wall 18. This divergence and also the size of the exit opening may be adjusted by means of the movable bottom wall 19 hinged at 20 and adapted to be rotated by a hand wheel 21 located outside of the cabinet.

The modification shown in Figures 4 and 5 differs from the foregoing in several particulars. The passage leading from the tone arm of the phonograph to the first reflector instead of being a frustrum of a pyramid is a slightly tapering pipe 22 which may be of cast metal, preferably of non-resonant quality such as lead; and the remainder of the area previously closed by the base of the pyramid is now closed by wall 23. The smaller divergence toward the open end of the pipe 22 permits very much less expansion of the wave with the advantage that the waves are of the greater intensity at the point where they impinge upon the sonorous reflector. Moreover, the lines of direct projection of the wave (the "sound beam," $a'-b'$, $f-g$ and $h-i$) fall on the upper half of the reflector 12', and the lower half and the sides are thus in position to intercept and reflect a very considerable sector ($h-j-i$) of the lateral diffusion from the main "beam." The initial wave front being small, the subsequent main reflection beam $g-k$, $i-l$ has a correspondingly small front so that the second reflector 13' intercepts and reflects lateral diffusion waves in sector $i-l-j$, while the third reflector 14' intercepts and reflects diffusion from the upper side of said beam. The general result is that much more of the energy of the diffusion is reflected in the same general direction and approximately in phase with the main beam.

Another feature consists in making the non-resonant sides diverge uniformly from the edges of the first sonorous reflector to the mouth of the projector. This has the functional advantage of permitting lateral expansion of the outgoing waves and also the structural advantage that the sides may be single pieces each cut on the same pattern from a plain piece of half inch spruce board.

Another feature consists in making the sensitive sound board element of minimum thinness, say 1/16 inch spruce, filled and finished as above described, and re-inforcing their transverse resilience by backing them with the stretched wires referred to above. The tensions of the several wires being separately applied to the back side of the thin sound board at distributed points through separate piers or thrust members, the effective resilience, sensitiveness and vibration periodicity of the entire sonorous reflecting area, may be controlled and predetermined within wide limits. A suitable structure for this purpose consists of a cast metal frame 25 drilled to receive tapering pins having square ends 26 to receive a socket type of tuning wrench or similar device commonly employed for such purposes. Holes are drilled in the pins to receive piano wire 27 or similar tensioning and vibrating means. Guide pins 28, 29 are also fixed into the metal plates to hold the wires in fixed relation. These elemental means for stretching wires are well known in piano constructions and analogous relations and any other desired means may be utilized for the same purpose.

Between each wire and the sound board, preferably at the center of the wire, are arranged wooden piers or studs 30 which are preferably glued to the back of the sonorous reflecting element. Across the tops of the wooden studs are placed small steel cylinders or rods 31 upon which the tension wires rest.

As explained above, the tensioning of the several wires on each reflector element should be such as to modify the tension of different portions of the sonorous reflecting area so that all the parts will react harmoniously with each other in sympathetic vibration with the reflected air waves.

As will be evident from the dotted lines on Figures 5 and 8 showing the path of the main undiffused portion of the sound beam, the incident waves are applied to the sonorous reflectors gradually, one edge $f$—$g$ of the beam impinging and being reflected first, and the center $a'$—$b'$ later, and so on until the entire cross section of the beam to $h$—$i$ has impinged and has been reflected. Subsequent reflections are similarly gradual and progressive as to both time and place.

As before stated, the sonorous plates set in vibration by the main beam become secondary sources of sound propagated more or less perpendicularly from the surface thereof, as indicated in Figure 8. For instance, vibratory movement of the plate 12' in the direction of the arrows $k$, $k$ projects sound waves along lines $k$—$l$, $k$—$l$, $k$—$l$. The flanks of these waves are laterally guided for a considerable portion of the distance by the parallel plates 13'—14'. Beyond plate 13' the flank being unguided, there is lateral diffusion toward the mouth of the projector, as indicated by sector $q$—$r$, $q$—$s$. The undiffused direct portion of the waves incident at $l$, $l$ on plate 17, is reflected along lines $m$, $m$.

Similarly the movement of plate 14' in the direction of arrows $n$—$n$ will project waves along lines $n$—$o$. Some of these striking the upper face of 18 will be reflected along lines $o$—$p$, $o$—$p$ while others will emerge from the projector, unreflected and substantially parallel with waves $l$—$m$.

At the mouth of the reflector these various beams will be subject to lateral diffusion and will blend, the spherical diffusion always becoming more and more parallel at greater distance from the mouth of the projector. Actual experiment with the precise form of outlet shown in Figure 8 shows that sounds are in fact more intense in a region a considerable distance below the horizontal and also in a region considerably above the horizontal, than they are in the region directly on a level with the mouth of the projector. In other words, the sound proceeding along the region of lines $l$—$m$ and $n$—$o$ and also in a region along lines $q$—$p$ and $q$—$s$ seem to carry more total energy than the sounds directly in line with the horizontally-projected main beam. From this it is obvious that the distribution of sound may be directed and controlled by inclining the wall 17 upward so that the $l$—$m$ beam will be more nearly horizontal, or by extending it further to the left so that more of the $q$—$r$, $q$—$s$ sector will be intercepted. Similarly plate 18 may be extended to the left or may be adjusted upward about $q$ as a center (as indicated in dotted lines, Figure 1).

Theoretically the direct waves caused by movement of plate 13' in the direction of arrow $t$ and of plate 14' in the direction of arrow $u$ will emerge only by lateral diffusion and their direct energies will be expended the one upon the other in causing or maintaining the sympathetic vibrations. By making plates 13' and 14' slightly diverging these waves $t$, $u$, may be made to progress outwardly by successive reflections.

It will be understood that the above described instance where the intensity of sound in the main beam was in fact less than at points above and below the beam, was a special case and the result was probably due to the fact that the sonorous plates were relatively thin and of considerable area and were not backed by the stretched wires described in connection with Figure 5. Such plates were exceptionally sensitive and capable of building up physical vibrations of considerable amplitude absorbing relatively large fractions of the energy of the incident waves leaving a correspondingly smaller fraction of the energy to be reflected. A reverse condition may be easily produced however, since the higher the elastic stiffness of the plates, the greater will be the proportion of energy reflected. This elastic stiffness may be controlled either by a predetermined size, thickness or material of the plates, or else, for a given plate, by employing an adjustable tension wire or wires as described in connection with Figure 5. In this way the sound boards may be adjusted or "tuned" to vary the proportions of the emitted main reflection beam and the secondary beams propagated from the plates as secondary vibratory sources.

While I am not yet prepared to commit myself to any theory on the subject, it is very evident that the right angle arrangement of two adjacent reflecting walls on the same side of the projector in connection with the expanding conduit 11 adapted to guide the air waves to the reflector on three flanks of the beam, whereby the entering waves are immediately given two right angle reflections to a total angle of 180° while being projected toward the mouth of the horn has a very advantageous effect on the quality of the sound, even when the two reflectors are solid surfaces.

Whatever portion of the energy of the sound waves emerging from the open end of the projector is reflected by impact with the external air is free to travel backward over the reverse path to produce the stationary waves characteristic of air column resonance.

While I have shown and described with considerable exactness two practical forms of my device, it will be understood that the same principles of amplification by consonance of sonorous reflectors excited by high angle impingement of the waves thereon may be embodied in projectors of quite different construction; that the number of reflectors and their reflecting angles may be varied and that sympathetic vibrators other than wires may be employed.

Moreover, while the above devices and methods as herein disclosed were primarily devised and are peculiarly adapted for phonographs, they may be employed for amplification of other air waves, particularly periodic wave trains or musical wave trains generated by other diaphragm instruments as for instance, telephonic receivers, or directly from any variety of sound producing instrument or even sound propagated directly from the human throat. In the latter case the amplification will be more effective with respect to the musical sounds produced in singing or the quasi-musical vowel sounds of speech.

I claim:

1. The method of amplifying and projecting air sound waves, which consists in permitting, guiding and limiting approximately uniform progressive expansion of the wave front on two opposite sides and, at the same time, on two other sides, directing the advance of the waves by successive high angle reflections from successive sensitive sonorous reflectors operating consonantly to reinforce as well as reflect the same, said sonorous reflectors being substantially plane and of successively greater areas.

2. The method of amplifying and projecting air sound waves, which consists in permitting, guiding and limiting progressive expansion of the wave front on two opposite sides and, at the same time, on two other sides, directing the advance of the waves by successive high angle reflections from successive sensitive sonorous reflectors operating consonantly to reinforce as well as reflect the same, said sonorous reflectors being of progressively less transverse resilience and lower natural frequency in the direction of propagation of the sound waves.

3. The method of amplifying and projecting air sound waves, which consists in permitting, guiding and limiting progressive expansion of the wave front on two opposite sides and, at the same time, on two other sides, directing the advance of the waves by successive high angle reflections from successive sensitive sonorous reflectors operating consonantly to reinforce as well as reflect the same, said sonorous reflectors being substantially plane and of progressively less transverse resilience and lower natural frequency in the direction of propagation of the sound waves.

4. An amplifying projector having diverging walls to afford limited expansion on two sides and, intermediate the ends thereof, two adjacent approximately plane reflectors at approximately right angles to each other in combination with a sound conducting tube of small cross section arranged to project sound waves into successive impingement upon said reflectors at angles of approximately 45° whereby the waves are divergently projected out of the projector, directed on two sides by reflection, and on two other sides by guidance substantially without reflection.

5. In an amplifying projector having two opposite walls gradually diverging from a small area inlet to a large area outlet, to afford on said two opposite sides, guided expansion of the sound waves substantially without reflecting the same; and having another side formed with a plane reflecting wall at a high angle to the axis of the inlet and a second plane reflecting wall closely adjacent to the first reflector at a high angle thereto, whereby a part of incoming sound waves are immediately reflected twice in the same direction through total angles of approximately 180°, while being permitted guided expansion without reflection on said other two sides.

6. A sound amplifying projector of rectangular cross-section having two opposite walls of gradual divergence, adapted to afford a guided expansion of the waves on two opposite sides substantially without reflecting the waves; and having two other opposite walls constituting a succession of approximately plane, high angle reflectors, progressively reflecting the waves toward the mouth of the projector, and each adapted to intercept and reflect substantially all of direct reflections from the next preceding reflector.

7. A continuous sound guiding conduit comprising a tube of relatively small cross-section terminating in an amplifying projector of rapidly expanding cross-section to afford a substantially continuous expansion of sound waves propagated therethrough; said projector having two substantially plane reflecting walls closely adjacent each other on the same side of the projector at approximately right angles to each other, the first of said plane reflecting walls being closely adjacent the discharge outlet of said sound guiding conduit and of size sufficient to intercept substantially the entire wave front of the sound beam propagated from said conduit at an angle of 45° and deflect the same through an angle approximately 90°; and said second plane reflecting wall being closely adjacent said first reflecting wall to immediately intercept said reflected sound waves at an angle of approximately 45°, whereby waves from the second reflecting wall are propagated approximately parallel with but in the opposite direction to the waves projected from said conduit.

8. An amplifying projector having two opposite walls adapted to guide and permit limited expansion of the sound waves on two flanks substantially without reflection, and having two other walls having approximately plane surfaces arranged to advance the waves by successive high angle reflections while permitting free flank expansion toward the mouth of the projector between reflections.

9. An amplifying projector having diverging walls to afford limited and guided expansion on two flanks of the sound beam and, on another flank of the sound beam, approximately plane reflecting surfaces arranged to advance the sound waves by successive reflections whereby the waves are divergently directed on two sides by successive reflections and free flank expansion toward the mouth of the projector, and, on two other sides by continuous flank guidance substantially without reflection.

10. A sound projector having divergent walls, a substantially plane surface closing the rear end thereof and a wall adjacent said rear end presenting another approximately plane surface at a high angle to that first mentioned, in combination with a sound conducting passage adapted to project waves upon said rear plane surface from one edge thereof at an acute angle so as to cause reflection upon said second plane surface, and from the latter, reflection toward the mouth of the projector in a path approximately parallel with but of opposite direction to the path of the entering waves.

11. An amplifying projector having guiding sides, and at the rear end thereof two plane surfaces at right angles to each other, in combination with a conduit entering the projector transversely and adapted to direct sound waves upon one of said surfaces at an angle of approximately 45° for reflection forward to said other surface, and reflection from the latter toward the mouth of the projector.

12. The method of amplifying and projecting air sound waves, which consists in permitting, guiding and limiting progressive expansion of the wave front, by non-consonant lateral walls on two opposite sides for a distance not less than one foot, and, at the same time, on two other sides, directing the advance of the waves by successive high angle reflections from successive sensitive sonorous reflectors operating consonantly to reinforce as well as reflect the same.

13. The method of amplifying and projecting air sound waves, which consists in permitting, guiding and limiting progressive expansion of the wave front, by non-consonant lateral walls on two opposite sides for a distance not less than one foot, and, at the same time, on two other sides, directing the advance of the waves by successive high angle reflections from successive sensitive sonorous reflectors operating consonantly to reinforce as well as reflect the same, said sonorous reflectors being substantially plane and being of progressively less transverse resilience and lower natural frequency in the direction of propagation of the sound waves.

14. A tubular projector of length sufficient to afford air column resonance for sound waves of the lower phonographic frequencies, and having in its walls a plurality of sonorous reflectors, each comprising a rigid non-sonorous frame, a plane, thin sheet of sonorous material secured in position to close the opening in said frame, arranged to successively reflect sound waves from the inlet end toward the outlet end thereof, the successive angles of reflection being not less than 30° nor more than 60°.

15. A tubular projector of greater length than width to afford an air column to be traversed by the sound waves, said projector having certain of its walls non-sonorous and progressively divergent, and, in other walls, thin flat sonorous reflectors arranged to successively reflect toward the outlet, sound waves proceeding from the inlet end of the projector.

16. A tubular projector of greater length than width to afford an air column to be traversed by the sound waves, and having in its walls a plurality of sonorous reflectors each comprising a rigid non-sonorous frame, a plane, thin sheet of sonorous material secured in position to close the opening in said frame, said reflectors being arranged at an angle to one another to successively reflect sound waves from the inlet end toward the outlet end thereof, the successive angles of reflection being not less than 30° nor more than 60°.

17. A tubular projector of greater length than width to afford an air column to be traversed by the sound waves, said projector having certain of its walls non-sonorous and progressively divergent, and having in its walls a plurality of sonorous reflectors, each comprising a rigid non-sonorous frame, a plane, thin sheet of sonorous material secured in position to close the opening in said frame, said reflectors being arranged at angles adapted to successively reflect sound waves from the inlet end toward the outlet end thereof, the successive angles of reflection being not less than 30° nor more than 60°.

18. A tubular projector having in its walls a plurality of sonorous reflectors each comprising a rigid non-vibratory frame, a plane, thin sheet of sonorous material secured in position to close the opening in said frame, arranged in opposite approximately parallel relation to successively reflect sound waves from the inlet end toward the outlet end thereof, the successive angles of reflection being not less than 30° nor more than 60°.

19. A tubular projector having certain of its walls non-sonorous and progressively divergent and having in its walls a plurality of sonorous reflectors each comprising a rigid non-vibratory frame, a plane, thin sheet of sonorous material secured over the opening in said frame, arranged in opposite approximately parallel relation to successively reflect sound waves from the inlet end toward the outlet end thereof, the successive angles of reflection being not less than 30° nor more than 60°.

20. A tubular projector of length sufficient to afford air column resonance for sound waves of the lower phonographic frequencies, having certain portions of its walls relatively thick and non-sonorous and having at least one other wall portion consisting of a thin flat sonorous reflector arranged to reflect toward the outlet sound waves proceeding from the inlet end of the projector.

21. A sound projector having a sonorous reflector comprising a rigid non-vibratory frame, a plane sheet of sonorous material having two opposite side edges secured along their entire length to the corresponding members of said rigid non-vibratory frame, in combination with means for impinging thereon, sound waves in air at an angle not less than 30° nor more than 60°.

22. A sound projector having a sonorous reflector comprising a rigid non-vibratory frame, a plane sheet of sonorous material secured over the opening in said frame, in combination with means for impinging thereon, sound waves in air at an angle not less than 30° nor more than 60°.

23. A projector comprising a conduit of length sufficient to afford an air path not less than one foot long, said projector having two opposite non-sonorous walls and two other opposite walls having thin flat sonorous reflectors arranged to successively reflect toward the outlet sound waves proceeding from the inlet end of the projector.

24. A tubular projector having two opposite non-sonorous walls and two other opposite walls comprising thin flat sonorous reflectors arranged to successively reflect toward the outlet sound waves proceeding from the inlet end of the projector.

25. A sound projector of rapidly increasing cross section toward the outlet end thereof but with one diameter increasing much more rapidly than the other, the walls in the direction of the smaller diameters being formed or provided with flat reflecting surfaces arranged to direct the sound waves from the inlet through the outlet thereof by successive complete reflections, and the walls opposite the greater diameters being arranged to laterally guide and limit expansion of the wave front without reflecting the waves.

26. A sound projector of rapidly increasing cross section toward the outlet end thereof but with one diameter increasing much more rapidly than the other, the walls in the direction of the smaller diameters being formed or provided with flat reflecting surfaces and the walls in the direction of the greater diameters diverging gradually to expand the wave front laterally without reflecting the waves.

27. A tubular projector having two opposite walls formed with flat reflector elements comprising thin, sonorous sheet material adapted to advance sound waves by successive high angle reflections from the inlet toward the outlet end thereof, in combination with supplemental means for modifying the transverse resilience of said reflectors.

28. A tubular projector having two opposite walls formed with flat reflector elements comprising thin, sonorous sheet material adapted to advance sound waves by successive high angle reflections from the inlet toward the outlet end thereof, in combination with supplemental means for independently varying the transverse resilience of various portions of the area of each of said reflectors, said means comprising wires stretched across the frame opening in the rear of the reflectors and thrust members interposed between the stretched wires and the reflectors.

29. A tubular projector having two opposite walls formed with flat reflector elements comprising thin, sonorous sheet material adapted to advance sound waves by successive high angle reflections from the inlet toward the outlet end thereof, said reflectors being of progressively increasing size and each reflector of progressively increasing width toward the outlet, in combination with supplemental means for modifying the transverse resilience of said reflectors.

30. A tubular projector having two opposite walls formed with flat reflector elements comprising thin, sonorous sheet material adapted to advance sound waves by successive high angle reflections from the inlet toward the outlet end thereof, said reflectors being of progressively increasing size and each reflector of progressively increasing width toward the outlet, in combination with supplemental means for independently varying the transverse resilience of various portions of the area of each of said reflectors, said means comprising wires stretched across the frame opening in the rear of the reflectors and thrust members interposed between the stretched wires and the reflectors.

31. A sound projector having a wall formed with a flat reflector adapted to advance sound waves by high angle reflection, said reflectors comprising rigid frame members, and a thin sonorous sheet secured over the opening of said frame, in combination with supplemental means for modifying the transverse resilience of said reflector.

32. A sound projector having a wall formed with a flat reflector adapted to advance sound waves by high angle reflection, said reflectors comprising rigid frame members, and a thin sonorous sheet secured over the opening of said frame, in combination with supplemental means for independently varying the transverse resilience of various portions of the area of said reflector, said means comprising wires stretched across the frame opening in the rear of the said sheet and thrust members interposed between the stretched wires and the sheet.

33. A sound projector having a wall formed with a flat reflector adapted to advance sound waves by high angle reflection, said reflector comprising rigid frame members, and a thin sonorous sheet secured over the opening of said frame, in combination with supplemental means for independently varying the transverse resilience of various portions of the area of said reflector, said means comprising a metal frame secured to the back of said frame, wires stretched across the frame opening in the rear of the said sheet and thrust members interposed between the stretched wires and the sheet.

34. A sound projector having two opposite walls formed with flat reflectors adapted to advance sound waves by successive high angle reflections from the inlet toward the outlet end thereof, said reflectors comprising rigid frame members, and thin sonorous sheets of wood secured over the openings of said frame members, in combination with supplemental means for independently varying the transverse resilience of various portions of the area of each of said reflectors, said means comprising a metal frame secured to said frame, wires stretched across the frame in the rear of said sheets and thrust members interposed between the stretched wires and said sheets.

35. A sound projector having two opposite walls formed with flat reflectors adapted to advance sound waves by successive high angle reflections from the inlet toward the outlet end thereof, said reflectors being of progressively increasing size and each reflector being of progressively increasing width toward the outlet, said reflectors comprising rigid frame members, and thin sonorous sheets of wood secured over the openings of said frame members, in combination with supplemental means for independently varying the transverse resilience of various portions of the area of each of said reflectors, said means comprising a metal frame secured to said frame, wires stretched across the frame in the rear of said sheets and thrust members interposed between the stretched wires and said sheets.

36. The method of amplifying and projecting air sound waves, which consists in directing the advance of the waves by successive high angle reflections from successive plane, sensitive, sonorous reflectors of successively larger sizes operating consonantly to reinforce as well as reflect the same.

37. The method of amplifying and projecting air sound waves propagated in a tube of relatively small diameter as compared with the half wave length, which method consists in directing the advance of the waves discharged from said tube by reflection from a flat sensitive sonorous reflector at an angle high enough to cause sympathetic vibration of said reflector but sufficiently acute so that both the reflected waves and the secondary waves originated by the sympathetic vibration of the reflector will substantially clear the mouth of said tube, then guiding the advance of the secondary waves by a lateral wall and the advance of the reflected waves by reflection from the same wall.

Signed at New York city, in the county of New York and State of New York, this 17th day of May, A. D. 1919.

ELWOOD GRISSINGER.